United States Patent
Iwashimizu et al.

(10) Patent No.: US 11,387,618 B2
(45) Date of Patent: Jul. 12, 2022

(54) LASER BEAM IRRADIATION APPARATUS AND LASER BEAM IRRADIATION SYSTEM

(71) Applicants: MITSUBISHI HEAVY INDUSTRIES, LTD., Tokyo (JP); RIKEN, Saitama (JP)

(72) Inventors: Masashi Iwashimizu, Tokyo (JP); Hiroyuki Daigo, Tokyo (JP); Shingo Nishikata, Tokyo (JP); Kazunori Masukawa, Tokyo (JP); Atsushi Ochiai, Tokyo (JP); Toshikazu Ebisuzaki, Saitama (JP); Satoshi Wada, Saitama (JP); Yoshiyuki Takizawa, Saitama (JP)

(73) Assignees: MITSUBISHI HEAVY INDUSTRIES, LTD., Tokyo (JP); RIKEN, Saitama (JP)

( * ) Notice: Subject to any disclaimer, the term of this patent is extended or adjusted under 35 U.S.C. 154(b) by 205 days.

(21) Appl. No.: 16/629,113

(22) PCT Filed: Apr. 25, 2018

(86) PCT No.: PCT/JP2018/016832
§ 371 (c)(1),
(2) Date: Jan. 7, 2020

(87) PCT Pub. No.: WO2019/021559
PCT Pub. Date: Jan. 31, 2019

(65) Prior Publication Data
US 2020/0227881 A1    Jul. 16, 2020

(30) Foreign Application Priority Data

Jul. 27, 2017 (JP) ............................. JP2017-145402

(51) Int. Cl.
| | | |
|---|---|---|
| *H01S 3/067* | (2006.01) |
| *H01S 3/10* | (2006.01) |
| *G02B 6/32* | (2006.01) |

(52) U.S. Cl.
CPC ................ *H01S 3/067* (2013.01); *H01S 3/10* (2013.01); *G02B 6/32* (2013.01)

(58) Field of Classification Search
CPC ..................................................... H01S 3/067
(Continued)

(56) References Cited

U.S. PATENT DOCUMENTS 5,566,196 A    10/1996  Scifres
5,966,391 A    10/1999  Zediker et al.
(Continued)

FOREIGN PATENT DOCUMENTS

JP    47-30288    11/1972
JP    10-78530    3/1998
(Continued)

OTHER PUBLICATIONS

International Search Report dated Jul. 17, 2018 in International (PCT) Application No. PCT/JP2018/016832.
(Continued)

*Primary Examiner* — Tuan N Nguyen
(74) *Attorney, Agent, or Firm* — Wenderoth, Lind & Ponack, L.L.P.

(57) ABSTRACT

A laser beam irradiation apparatus including: a plurality of laser light sources emitting first laser beams; and a light-condensing optics system having an incident face on which the first laser beams are made incident and performing an optical operation on the first laser beams to emit second laser beams. The plurality of laser light sources are configured to emit the first laser beams so that beam diameters are expanded towards the incident face. Each first laser beam (Continued)

overlaps at least one of the other laser beams on the incident face. The light-condensing optics system is configured so that beam diameters of second laser beams emitted from the light-condensing optics system are minimal on a target face, and a distance between a center of each second laser beam and the optical axis on the target face is smaller than a beam radius of each second laser beam on the target face.

6 Claims, 15 Drawing Sheets

(58) Field of Classification Search
USPC .................................................. 372/6
See application file for complete search history.

(56) References Cited

U.S. PATENT DOCUMENTS

| | | | |
|---|---|---|---|
| 6,272,155 | B1 | 8/2001 | Sekiguchi |
| 2004/0105482 | A1 | 6/2004 | Sugiyama et al. |
| 2005/0013328 | A1 | 1/2005 | Jurgensen |
| 2006/0249488 | A1 | 11/2006 | Jurgensen |
| 2006/0250658 | A1 | 11/2006 | Jurgensen |
| 2006/0255023 | A1 | 11/2006 | Jurgensen |
| 2009/0245305 | A1 | 10/2009 | Jensen et al. |
| 2009/0275927 | A1* | 11/2009 | Fein .................. H01S 3/2232 606/3 |
| 2011/0157706 | A1 | 6/2011 | Mitra et al. |
| 2011/0279888 | A1* | 11/2011 | Fini .................. H01S 3/06737 359/334 |
| 2015/0034613 | A1 | 2/2015 | Hosseini |
| 2015/0038313 | A1 | 2/2015 | Hosseini |
| 2015/0165551 | A1 | 6/2015 | Holmgren et al. |
| 2016/0036193 | A1 | 2/2016 | Eno et al. |
| 2016/0135892 | A1* | 5/2016 | Yu .................. A61B 18/22 606/3 |
| 2020/0324368 | A1 | 10/2020 | Hosseini |

FOREIGN PATENT DOCUMENTS

| | | |
|---|---|---|
| JP | 11-23867 | 1/1999 |
| JP | 11-23878 | 1/1999 |
| JP | 2000-126886 | 5/2000 |
| JP | 2001-68794 | 3/2001 |
| JP | 2001-255491 | 9/2001 |
| JP | 2002-524263 | 8/2002 |
| JP | 2003-25085 | 1/2003 |
| JP | 2003-290965 | 10/2003 |
| JP | 2004-184437 | 7/2004 |
| JP | 2005-294409 | 10/2005 |
| JP | 2006-278491 | 10/2006 |
| JP | 2007-7683 | 1/2007 |
| JP | 2008-147428 | 6/2008 |
| JP | 2011-39493 | 2/2011 |
| JP | 2011-128634 | 6/2011 |
| JP | 2011-523723 | 8/2011 |
| JP | 2014-192166 | 10/2014 |
| JP | 2015-30040 | 2/2015 |
| JP | 2015-72955 | 4/2015 |
| JP | 2016-033949 | 3/2016 |
| WO | 2016/077678 | 5/2016 |

OTHER PUBLICATIONS

Notice of Reasons for Refusal dated Apr. 14, 2021 in corresponding Japanese Patent Application No. 2017-145402, with English Translation.

English translation of the International Preliminary Report on Patentability and Written Opinion of the International Searching Authority dated Feb. 6, 2020 in International (PCT) Application No. PCT/JP2018/016832.

Notice of Reasons for Refusal dated Jan. 6, 2021 in corresponding Japanese Patent Application No. 2017-145402, with English translation.

Extended European Search Report dated Jun. 2, 2020 in corresponding European Patent Application No. 18839219.5.

\* cited by examiner

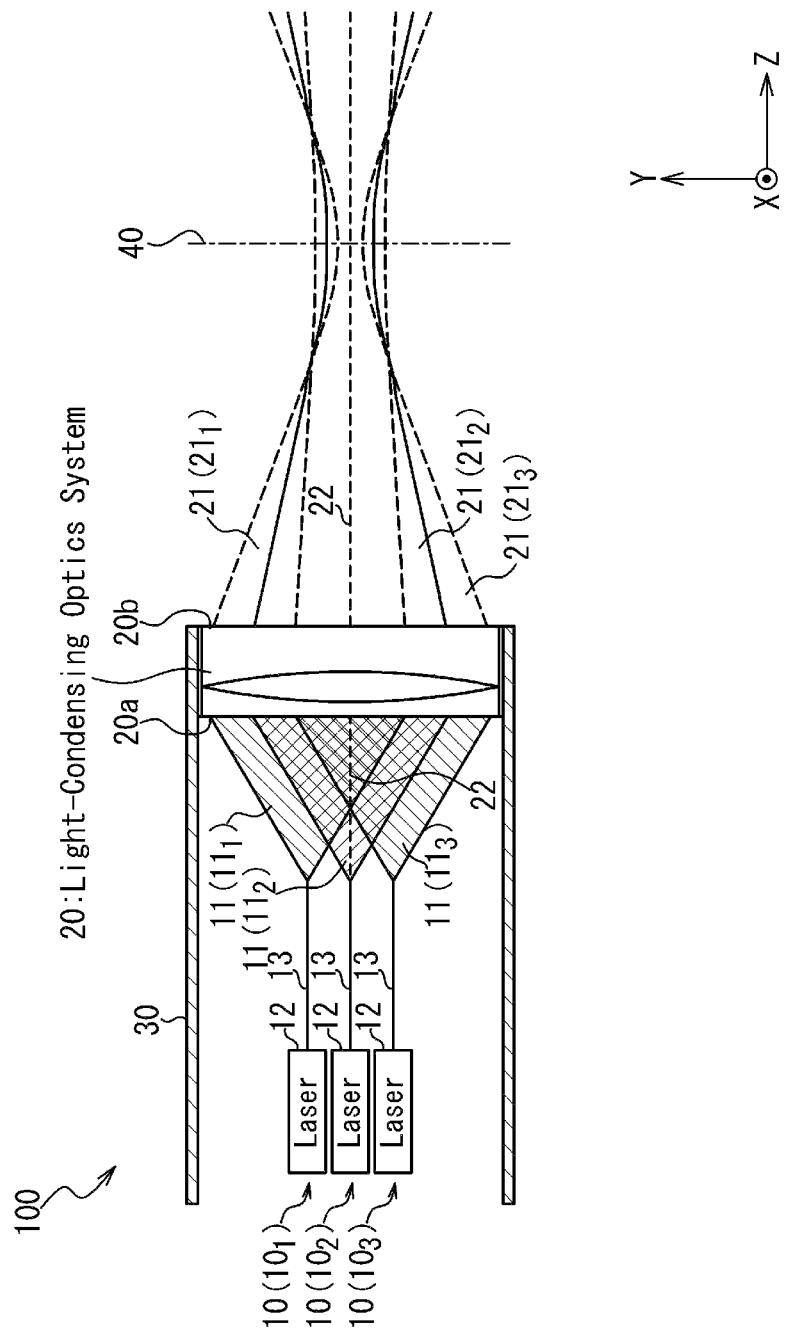

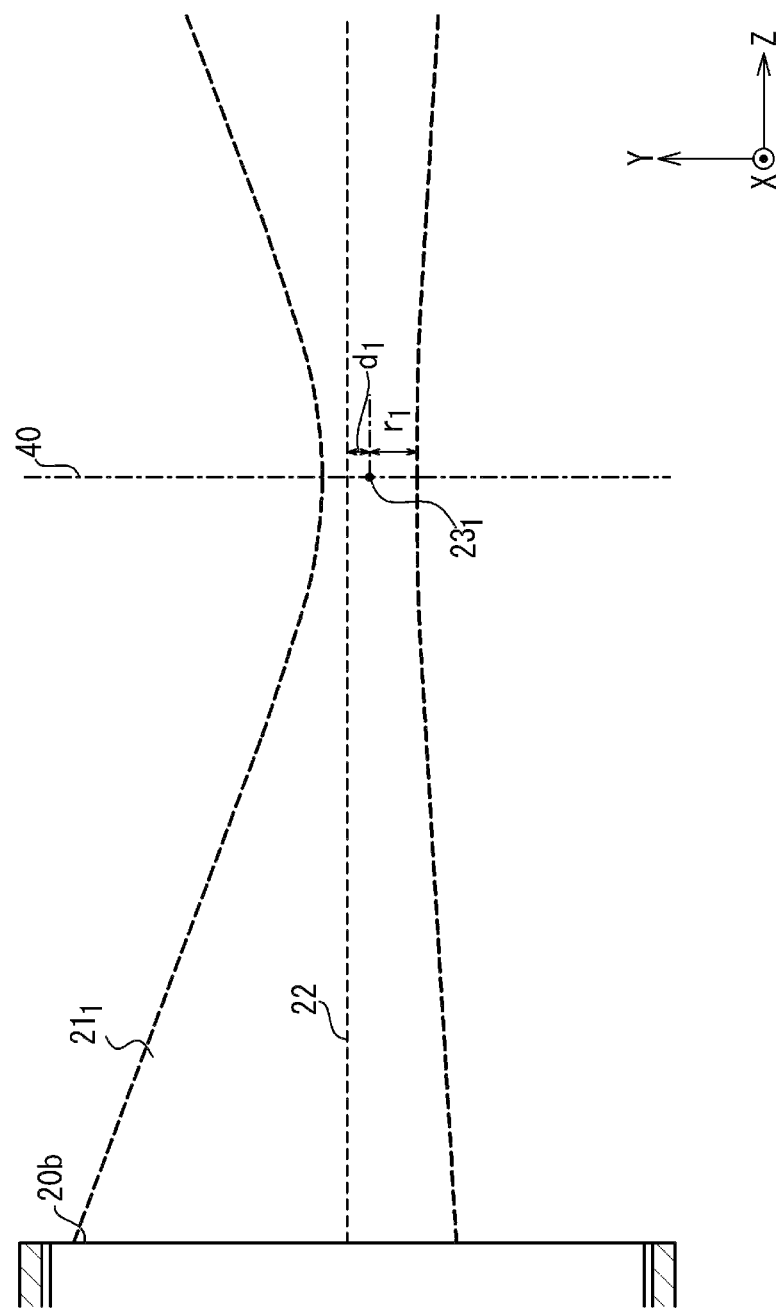

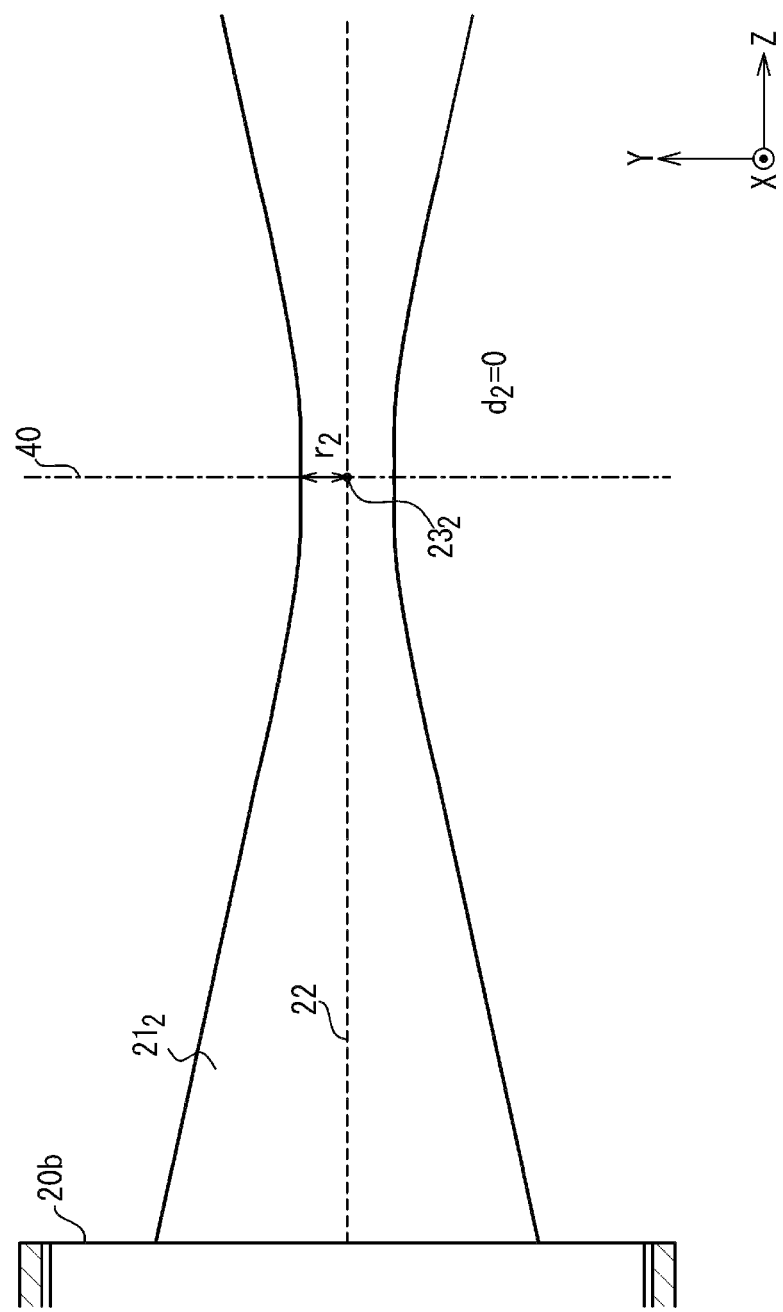

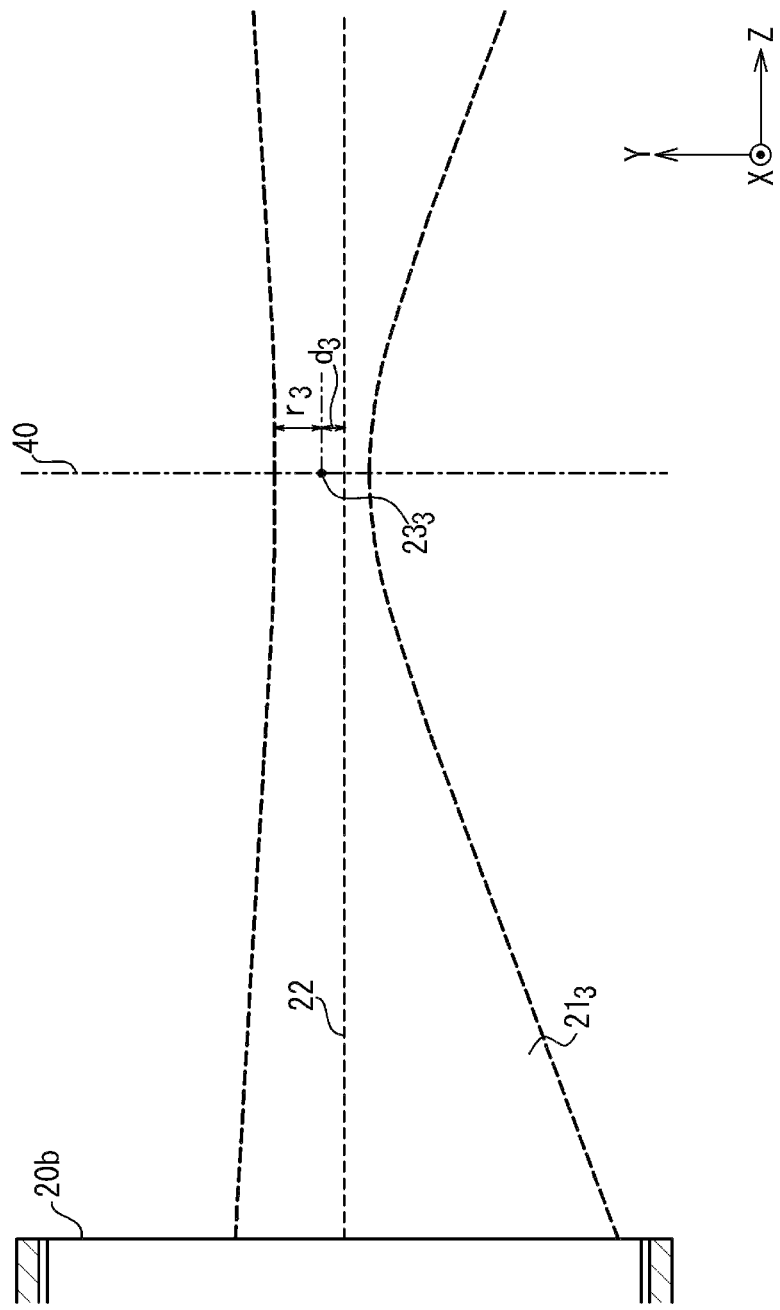

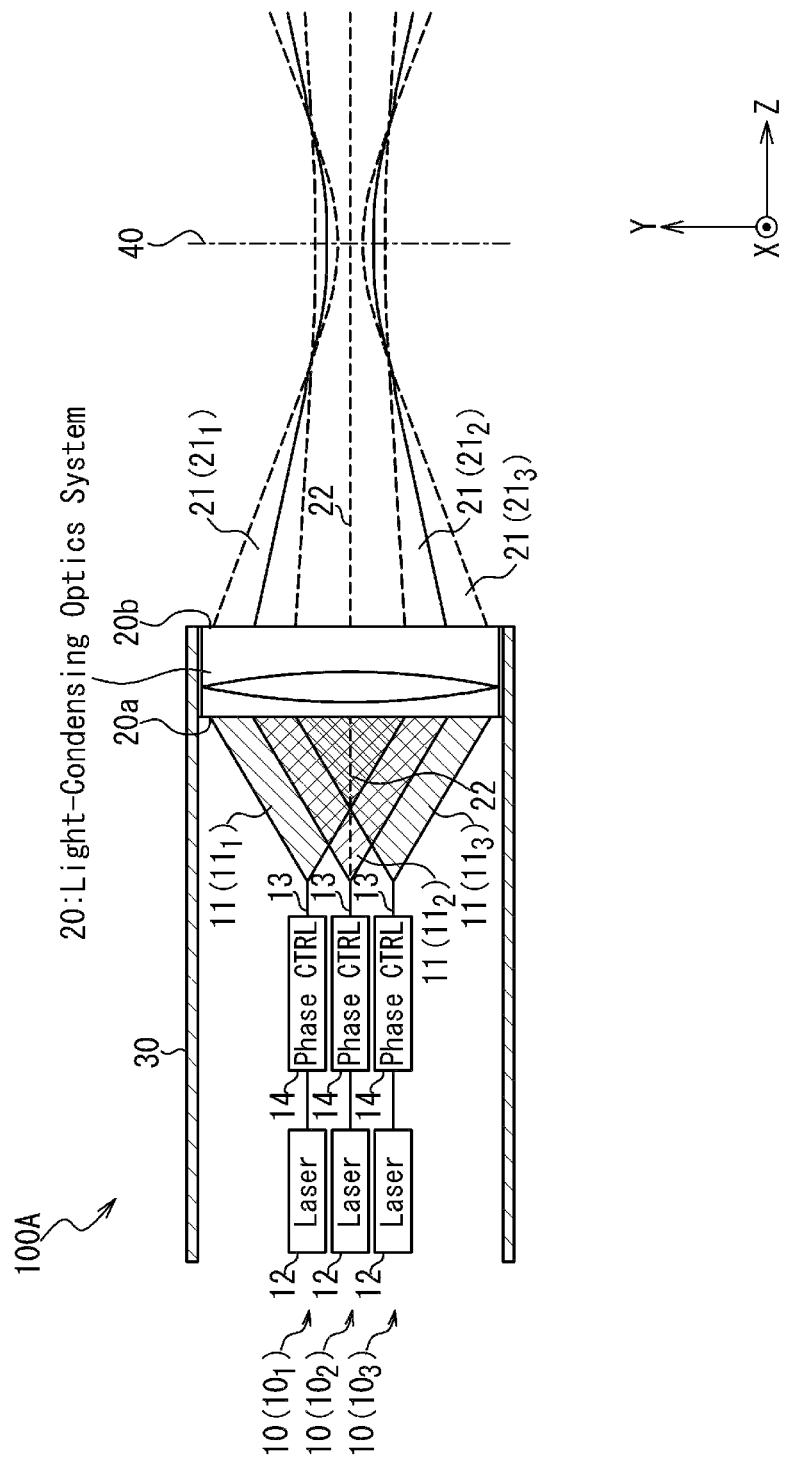

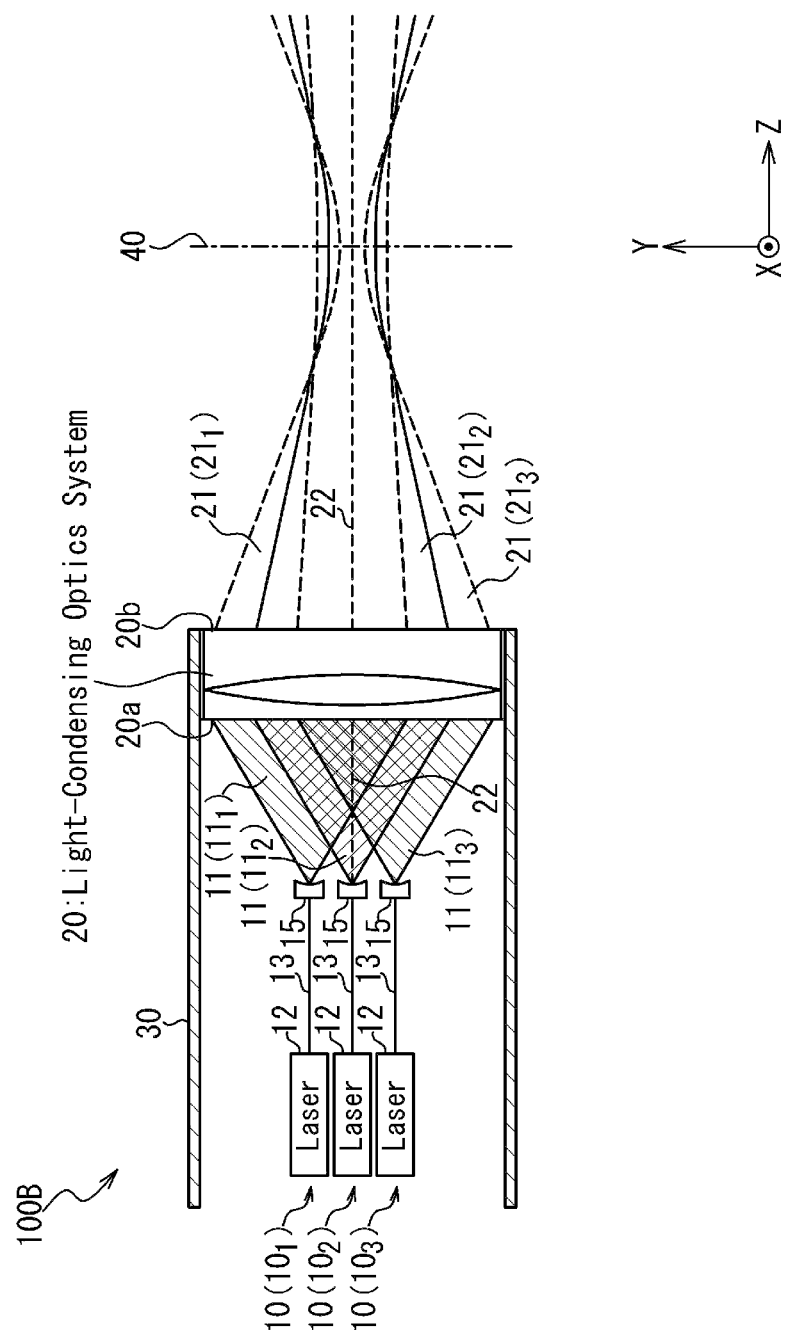

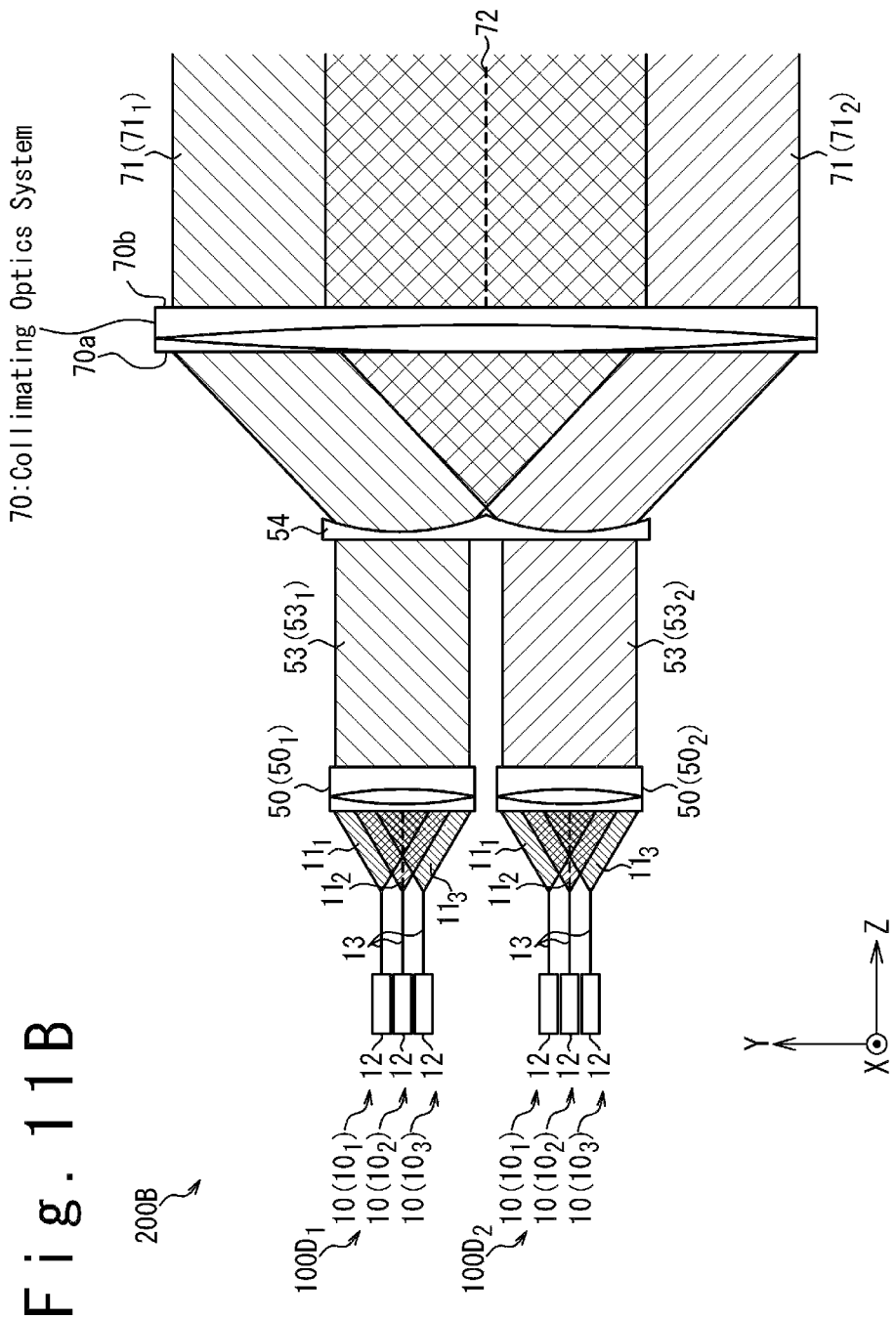

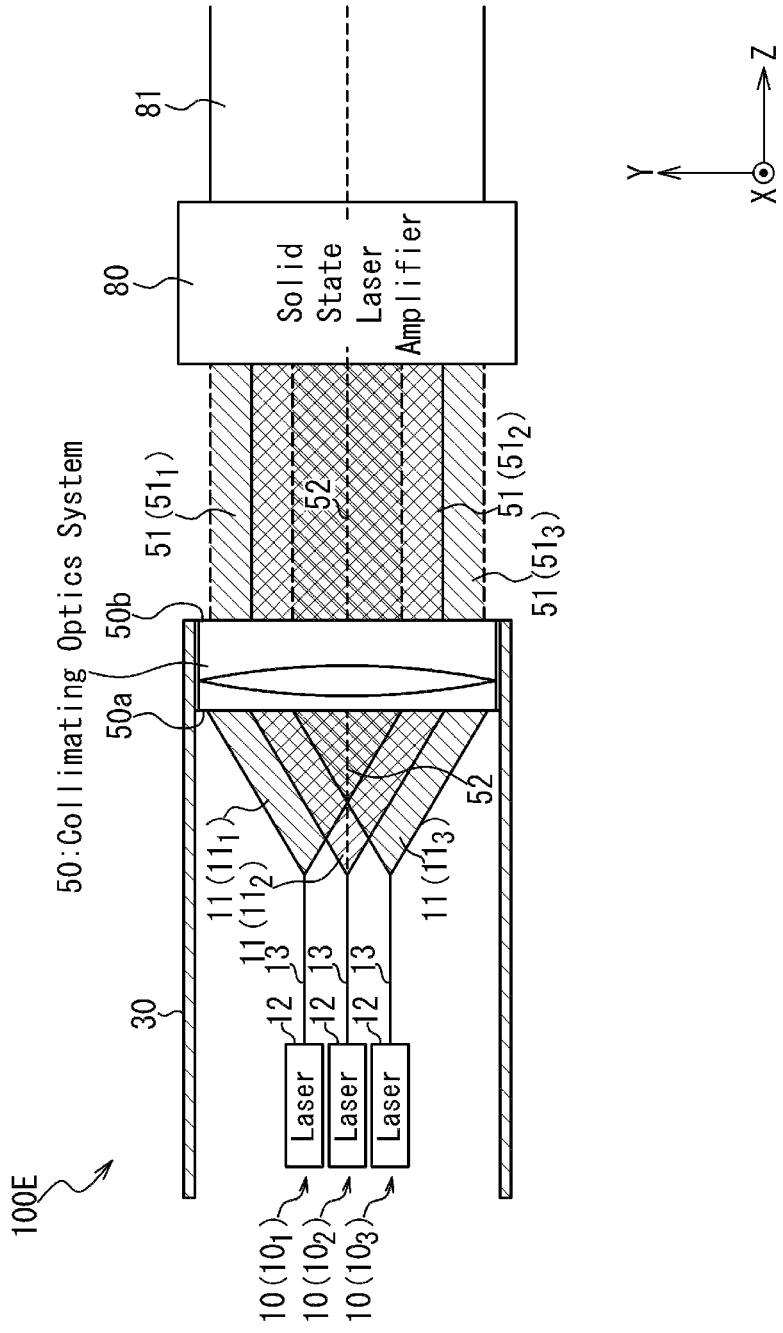

LASER BEAM IRRADIATION APPARATUS AND LASER BEAM IRRADIATION SYSTEM

TECHNICAL FIELD

The present invention relates to a laser beam irradiation apparatus and a laser beam irradiation system, more particularly, to a laser beam irradiation apparatus and a laser beam irradiation system configured to irradiate on a target a high-power laser beam obtained by combining a plurality of laser beams.

BACKGROUND ART

One method to obtain a high-power laser is to combine a plurality of laser beams which are separately generated. Methods of combining a plurality of laser beams can be generally classified into two types.

A first method is to combine a plurality of laser beams on the target. In this method, a plurality of laser beams are emitted from different positions at slightly different angles and irradiated on the target so that the plurality of laser beams are condensed at the same position defined on the target. When this method is used, the number of laser beams is in a trade-off relation with the beam diameters of the respective laser beams and the physical size of the irradiation apparatus. Although an increase in the number of emitted laser beams achieves high power, this is accompanied by an increase in the physical size of the irradiation apparatus (for example, the diameter of a lens barrel accommodating the optics system) for a fixed beam diameter, causing an increase in the weight. An increase in the weight of the irradiation apparatus may increase the manufacture cost and cause a problem of difficulty in the design of a mechanical drive mechanism (e.g., a drive mechanism of the lens barrel) of the irradiation apparatus. When the number of emitted laser beams is increased for a fixed physical size of the irradiation apparatus, on the other hand, the beam diameters of the respective laser beams are reduced, and this causes a problem of deterioration in the light-condensing ability, that is, increase in the focal spot diameter on the target.

A second method is to combine a plurality of laser beams internally in the irradiation apparatus. This method allows the diameters of the respective laser beams to be increased approximately up to the diameter of the lens barrel, since all the laser beams are coaxially emitted from the lens barrel.

The spectrum combination is a known method to combine a plurality of laser beams internally in an irradiation apparatus. The spectrum combination is a technique which combines a plurality of laser beams with a diffractive optical element such as a diffractive grating. A set of laser beams with slightly-different emitting angles are generated by irradiating a plurality of laser beams of slightly-different center wavelengths on an diffractive optical element which exhibits wavelength dependencies on the reflection angle and the diffraction angle, and the set of laser beams are coaxially combined in a light-emitting optics system by making use of the differences in the emitting angle. A technique for obtaining a high-power laser beam through spectrum combination is disclosed in JP 2015-72955A, for example.

One issue in the spectrum combination is that it is generally difficult to provide a large-sized diffractive optical element used for spectrum combination with high laser power tolerance. This implies there are limitations on the number of laser beams and the powers thereof. Additionally, it is necessary to sufficiently reduce the linewidths of the respective laser beams for increasing the number of laser beams, and this is generally contradictory to high power.

As discussed above, there is room for improvement in the technology for obtaining a high-power synthesized laser beam by combining a plurality of laser beams.

CITATION LIST

Patent Literature

[Patent Literature 1] JP 2015-72955 A

SUMMARY OF THE INVENTION

Accordingly, an objective of the present invention is to provide a technique for obtaining a high-power synthesized laser beams by combining a plurality of laser beams. Other objectives and new features of the present invention would be understood by a person skilled in the art from the following disclosure.

In one embodiment of the present invention, a laser beam irradiation apparatus comprises: a plurality of laser light sources emitting first laser beams, respectively; and a light-condensing optics system comprising an incident face on which the first laser beams are made incident and performing an optical operation on the first laser beams to emit second laser beams associated with the first laser beams, respectively. The plurality of laser light sources are configured to emit the first laser beams from different positions so that beam diameters of the first laser beams are expanded towards the incident face of the light-condensing optics system. Each of the first laser beams emitted from the plurality of laser light sources overlaps at least one of the other first laser beams on the incident face of the light-condensing optics system.

The light-condensing optics system is configured so that beam diameters of all the second laser beams emitted from the light-condensing optics system are minimal on a target face which is a plane defined to be orthogonal to an optical axis of the light-condensing optics system, and a distance between a center of each of the second laser beams and the optical axis on the target face is smaller than a beam radius which is half a beam diameter of each of the second laser beams on the target face.

It is preferable that each of the first laser beams emitted from the plurality of laser light sources overlaps all other first laser beams on the incident face of the light-condensing optics system.

In one embodiment, the plurality of laser light sources respectively comprise phase control devices controlling phases of the first laser beams emitted therefrom. In this case, the phase control devices may control the phases of the first laser beams so that phases of the second laser beams are made the same on an emitting face of the light-condensing optics system.

In one embodiment, the laser beam irradiation apparatus may further comprise a beam shaping optics system shaping wave fronts of the first laser beams. When the plurality of laser light sources respectively comprise phase control devices controlling phases of the first laser beams emitted therefrom, the laser beam irradiation apparatus may comprise a plurality of beam shaping optics systems respectively shaping wave fronts of the first laser beams emitted from the plurality of laser light sources.

In one embodiment, the plurality of laser light-sources may respectively comprise optical fibers emitting the first laser beams from respective ends thereof, and the laser beam irradiation apparatus may further comprise a coupling optical element. The coupling optical element is coupled to the optical fibers of the plurality of laser light sources and configured to guide the first laser beams emitted from the optical fibers to the incident face of the light-condensing optics system.

In another embodiment, a laser beam irradiation apparatus comprises: a plurality of laser light sources emitting first laser beams, respectively; and a collimating optics system comprising an incident face on which the first laser beams are made incident and performing an optical operation on the first laser beams to emit second laser beams which are collimated beams, the second laser beams being associated with the first laser beams, respectively. The plurality of laser light sources are configured to emit the first laser beams from different positions so that beam diameters of the first laser beams are expanded towards the incident face of the collimating optics system. Each of the first laser beams emitted from the plurality of laser light sources overlaps at least one of the other first laser beams on the incident face of the collimating optics system. The collimating optics system is configured so that a distance between a center of each of the second laser beams and an optical axis of the collimating optics system is smaller than a beam radius which is half a beam diameter of each of the second laser beams.

The laser beam irradiation apparatus may further comprise a solid-state laser amplifier receiving the plurality of second laser beams emitted from the collimating optics system and performing laser amplification on the plurality of second laser beams to generate an amplified laser beam. This configuration is useful especially when each of the laser light sources comprises a fiber laser.

In still another embodiment, a laser beam irradiation system comprises a plurality of laser beam irradiation apparatuses and a light-condensing optics system. Each of the plurality of laser beam irradiation apparatuses comprises: a plurality of laser light sources emitting first laser beams, respectively; and a collimating optics system comprising an incident face on which the first laser beams are made incident and performing an optical operation on the first laser beams to emit second laser beams which are collimated beams, the second laser beams being associated with the first laser beams, respectively. The plurality of laser light sources are configured to emit the first laser beams from different positions so that beam diameters of the first laser beams are expanded towards the incident face of the collimating optics system. Each of the first laser beams emitted from the plurality of laser light sources overlaps at least one of the other first laser beams on the incident face of the collimating optics system. The collimating optics system is configured so that a distance between a center of each of the second laser beams and an optical axis of the collimating optics system is smaller than a beam radius which is half a beam diameter of each of the second laser beams. Synthesized beams each composed of the plurality of the second laser beams emitted from each of the plurality of laser beam irradiation apparatuses are made incident on an incident face of the light-condensing optics system. The light-condensing optics system is configured to perform an optical operation on the synthesized beams to emit third laser beams respectively associated with the synthesized beams. The light-condensing optics system is configured so that beam diameters of all the third laser beams emitted from the light-condensing optics system are minimal on a target face which is a plane defined to be orthogonal to an optical axis of the light-condensing optics system, and a distance between a center of each of the third laser beams and the optical axis on the plane is smaller than a beam radius which is half a beam diameter of each of the third laser beams on the target face.

In still another embodiment, a laser beam irradiation system comprises a plurality of laser beam irradiation apparatuses; and a first collimating optics system. Each of the plurality of laser beam irradiation apparatuses comprises: a plurality of laser light sources emitting first laser beams, respectively; and a second collimating optics system comprising an incident face on which the first laser beams are made incident and performing an optical operation on the first laser beams to emit second laser beams which are collimated beams, the second laser beams being associated with the first laser beams, respectively. The plurality of laser light sources are configured to emit the first laser beams from different positions so that beam diameters of the first laser beams are expanded towards the incident face of the collimating optics system. Each of the first laser beams emitted from the plurality of laser light sources overlaps at least one of the other first laser beams on the incident face of the second collimating optics system. The second collimating optics system is configured so that a distance between a center of each of the second laser beams and an optical axis of the second collimating optics system is smaller than a beam radius which is half a beam diameter of each of the second laser beams. Synthesized beams each composed of the plurality of the second laser beams emitted from each of the plurality of laser beam irradiation apparatuses are made incident on an incident face of the first collimating optics system. The first collimating optics system is configured to perform an optical operation on the synthesized beams to emit third laser beams which are collimated beams, the third laser beams being associated with the synthesized beams, respectively.

The present invention effectively provides a technique for obtaining a high-power synthesized laser beams by combining a plurality of laser beams.

BRIEF DESCRIPTION OF DRAWINGS

FIG. 1 is a diagram schematically illustrating the configuration of a laser beam irradiation apparatus, according to a first embodiment;

FIG. 2A illustrates a beam shape of a laser beam generated by a light-condensing optics system from a laser beam emitted from a laser light source;

FIG. 2B illustrates a beam shape of a laser beam generated by the light-condensing optics system from a laser beam emitted from a laser light source;

FIG. 2C illustrates a beam shape of a laser beam generated by the light-condensing optics system from a laser beam emitted from a laser light source;

FIG. 3 is a diagram schematically illustrating the configuration of a laser beam irradiation apparatus, according to a second embodiment;

FIG. 4 is a diagram schematically illustrating the configuration of a laser beam irradiation apparatus, according to a third embodiment;

FIG. 11B is a diagram schematically illustrating the configuration of a laser beam irradiation system which comprises a plurality of laser beam irradiation apparatuses according to the fifth embodiment and is configured to combine synthesized laser beams generated by the respective laser beam irradiation apparatuses by using a collimating optics system; and FIG. 12 is a diagram schematically illustrating the configuration of a laser beam irradiation apparatus, according to a sixth embodiment.

DESCRIPTION OF EMBODIMENTS

Figure 5:
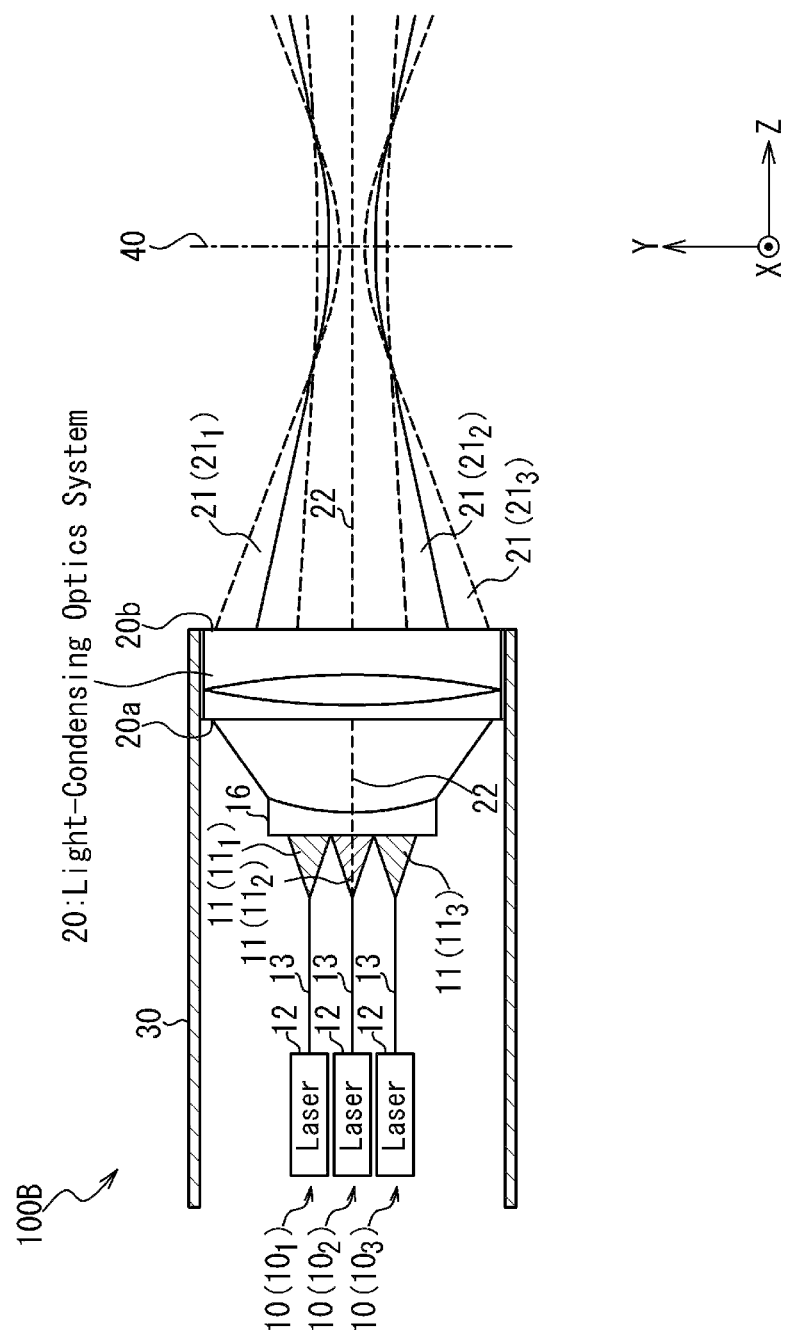
FIG. 5 is a diagram schematically illustrating the configuration of an example variation of the laser beam irradiation apparatus, according to the third embodiment.

In the following, a description is given of embodiments of the present invention with reference to the attached drawings. In the attached drawings, the same elements are denoted by the same reference numerals. Suffixes may be attached to distinguish the same elements from each other. In the following description, an XYZ Cartesian coordinate system is introduced to define directions.

First Embodiment

FIG. 1 is a diagram schematically illustrating the configuration of a laser beam irradiation apparatus 100, according to a first embodiment. The laser beam irradiation apparatus 100 comprises a plurality of laser light sources 10 and a light-condensing optics system 20. The laser light sources 10 and the light-condensing optics system 20 are housed in a lens barrel 30. In the following, suffixes are attached when the plurality of laser light sources 10 are distinguished from each other. In FIG. 1, three laser light sources $10_1$ to $10_3$ are illustrated. The number of the laser light sources 10 is not limited to three; four or more laser light sources 10 may be provided.

Each laser light source 10 emits a laser beam 11. In detail, each laser light source 10 comprises a laser device 12 and an optical fiber 13 in this embodiment. A laser beam generated by a laser device 12 is made incident on one end of an optical fiber 13, and emitted from the other end as a laser beam 11. In the following, the laser beams 11 emitted from the laser light sources $10_1$ to $10_3$ may be referred to as laser beams $11_1$ to $11_3$, respectively. In this embodiment, the laser light sources 10 emit the laser beams 11 from different positions in the Y axis direction. The laser beams 11 emitted from the laser light source 10 are made incident on an incident face 20a of the light-condensing optics system 20.

The light-condensing optics system 20 generates laser beams 21 by performing an optical operation on the laser beams 11 incident on the incident face 20a, and emits the generated laser beams 21 from an emitting face 20b. The optical operation performed by the light-condensing optics system 20 comprises an operation for condensing the respective laser beams 21. In the following, the laser beams 21 generated from the laser beams $11_1$ to $11_3$ and emitted from the emitting face 20b may be referred to as laser beams $21_1$ to $21_3$, respectively. In this embodiment, the light-condensing optics system 20 is arranged so that the optical axis 22 thereof is parallel to the Z axis direction. The laser beams 21 emitted from the emitting face 20b of the light-condensing optics system 20 are irradiated on a desired target, overlapping each other.

In the laser beam irradiation apparatus 100 according to this embodiment, each laser light source 10 is configured to emit a laser beam 11 so that the beam diameter of the laser beam 11 is expanded toward the incident face 20a of the light-condensing optics system 20. In general, when a laser beam is emitted from an optical fiber, the emitted laser beam naturally has an expanding angle. In one embodiment, this phenomenon may be used to expand the beam diameters of the laser beams 11 emitted from the optical fibers 13 towards the incident face 20a of the light-condensing optics system 20. Alternatively, an optical element such as a lens may be coupled to an optical fiber 13 to expand the beam diameter of a laser beam 11 emitted from the optical fiber 13 towards the incident face 20a of the light-condensing optics system 20.

Additionally, the laser light sources 10 are arranged so that the laser beam 11 emitted from each laser light source 10 overlaps at least one of the laser beams 11 emitted from the other laser light sources 10 on the incident face 20a. This configuration is advantageous for generating a high-power synthesized laser beam, while suppressing an increase in the physical size of the laser beam irradiation apparatus 100. Under this aim, when the number of the laser light sources 10 is three or more, it is preferable that the laser light sources 10 are arranged so that the laser beam 11 emitted from each laser light source 10 overlaps all the laser beams 11 emitted from the other laser light sources 10 on the incident face 20a.

The light-condensing optics system 20 is configured as follows. First, the light-condensing optics system 20 is configured so that, when a laser beam 11 of a beam shape circular symmetric about the optical axis 22 is made incident on the incident face 20a, the beam shape of a laser beam 21 generated from the laser beam 11 and emitted from the emitting face 20b is circular symmetric about the optical axis 22.

The light-condensing optics system 20 is further configured so that the beam diameters (or the spot diameters) of all the laser beams 21 emitted from the emitting face 20b are minimal on a target face 40 which is a plane defined orthogonally to the optical axis 22 of the light-condensing optics system 20. In this embodiment, the target face 40 is parallel to the XY plane. When the laser beams 21 are irradiated on a target, the target face 40 is set so that the target face 40 crosses the target. This implies that the light-condensing optics system 20 is configured to focus the respective laser beams 21 on the target face 40. The light-condensing optics system 20 may be configured so that the position of the target face 40 is adjustable in a direction parallel to the optical axis 22.

The light-condensing optics system 20 is further configured so that the distance between the optical axis 22 and the center of each laser beam 21 on the target face 40 is smaller than the beam radius of each laser beam 21 on the target face 40, where the beam radius is half the beam diameter. In this embodiment, the beam diameter on the target face 40 is defined as the D86 width (the diameter of the circle encompassing 86% of the beam power, the center of the circle being positioned at the geometric center of the beam profile). In this embodiment, the position of the center of each laser beam 21 on the target face 40 is defined as the position of the geometric center of the beam profile of each laser beam 21 on the target face 40. FIGS. 2A to 2C are diagram illustrating the beam shapes of the respective laser beams 21, according to this embodiment.

FIG. 2A illustrates the beam shape of the laser beam $21_1$ generated by the light-condensing optics system 20 from the laser beam $11_1$ emitted from the laser light source $10_1$. As illustrated in FIG. 2A, the beam diameter of the laser beam $21_1$ is minimal on the target face 40. The distance $d_1$ between the optical axis 22 and the center $23_1$ of the laser beam $21_1$ on the target face 40 is smaller than the beam radius $r_1$ of the laser beam $21_1$ on the target face 40 (that is, half the beam diameter of the laser beam $21_1$ on the target face 40). In other words, the following expression (1) holds:

$$d_1 < r_1. \tag{1}$$

FIG. 2B illustrates the beam shape of the laser beam $21_2$ generated by the light-condensing optics system 20 from the laser beam $11_2$ emitted from the laser light source $10_2$. The beam shape of the laser beam $11_2$ emitted from the laser light source $10_2$ is circular symmetric about the optical axis 22, and accordingly the beam shape of the laser beam $21_2$, which is emitted from the light-condensing optics system 20, is also circular symmetric about the optical axis 22.

As illustrated in FIG. 2B, the beam diameter of the laser beam $21_1$ is minimal on the target face 40, as is the case with the laser beam $21_1$. The center $23_2$ of the laser beam $21_2$ on the target face 40 is positioned on the optical axis 22, and the distance $d_2$ between the optical axis 22 and the center $23_1$ of the laser beam $21_2$ on the target face 40 is zero. Accordingly, the following expression (2) holds also for the laser beam $21_2$:

$$d_2 < r_2, \tag{2}$$

where $r_2$ is the beam radius of the laser beam $21_2$ on the target face 40 (that is, half the beam diameter of the laser beam $21_2$ on the target face 40).

FIG. 2C illustrates the beam shape of the laser beam $21_3$ generated by the light-condensing optics system 20 from the laser beam $11_3$ emitted from the laser light source $10_3$. As illustrated in FIG. 2C, the beam diameter of the laser beam $21_3$ is also minimal on the target face 40. The distance $d_3$ between the optical axis 22 and the center $23_3$ of the laser beam $21_3$ on the target face 40 is smaller than the beam radius $r_3$ of the laser beam $21_3$ on the target face 40 (that is, half the beam diameter of the laser beam $21_3$ on the target face 40). In other words, the following expression (3) holds:

$$d_3 < r_3. \tag{3}$$

The condition that the distance between the optical axis 22 and the center of each laser beam 21 on the target face 40 is smaller than the beam radius of each laser beam 21 is for maintaining the combination of the laser beams 21 on the target face 40. In this embodiment, since the laser beams 11 are made incident on the incident face 20a at different positions, the positions of the beam centers on the target face 40 of the laser beams 21 emitted from the emitting face 20b may be different from each other; however, when the distance between the optical axis 22 and the center of each laser beam 21 on the target face 40 is smaller than the beam radius of each laser beam 21 on the target face 40, each laser beam 21 overlaps all other laser beams 21 on the target face 40. This achieves beam combination.

The above-described configuration according to this embodiment makes it possible to irradiate a high-power synthesized laser beam on the target, while achieving suppression of an increase in the physical size of the laser beam irradiation apparatus 100 and improvement in the light-condensing ability.

In detail, the laser light sources 10 are arranged so that the laser beam 11 emitted from each laser light source 10 overlaps at least one of the laser beams 11 emitted from the other laser light sources 10 on the incident face 20a, in this embodiment. This achieves generation of a high-power synthesized laser beam while suppressing an increase in the physical size of the laser beam irradiation apparatus 100. When the number of the laser beams 11 is three or more, from the viewpoint of suppression in an increase in the physical size and generation of a high-power synthesized laser beam, it is preferable that the laser beam 11 emitted by each laser light source 10 overlaps the laser beams 11 emitted by all other laser light sources 10 on the incident face 20a.

Additionally, in the laser beam irradiation apparatus 100 according to this embodiment, each of the laser light sources 10 is configured to emit the laser beam 11 so that the beam diameter of the laser beam 11 is expanded towards the incident face 20a of the light-condensing optics system 20. Accordingly, the beam diameter of each laser beam 21 is enlarged on the emitting face 20b of the light-condensing optics system 20. This implies that the focal spot diameter of each laser beam 21 can be reduced on the target face 40. This effectively improves the light-condensing ability.

It should also be noted that the laser beam irradiation apparatus 100 offers laser beam combination without using a special optical element such as a diffraction optical element. The laser beam irradiation apparatus 100 according to this embodiment can generate a high-power synthesized laser beam without using a special optical element, while achieving suppression in an increase in the physical size and improvement in the light-condensing ability.

Second Embodiment

FIG. 3 is a diagram schematically illustrating the configuration of a laser beam irradiation apparatus 100A, according to a second embodiment. The laser beam irradiation apparatus 100A according to the second embodiment is configured similarly to the laser beam irradiation apparatus 100 according to the first embodiment; a difference from the laser beam irradiation apparatus 100 according to the first embodiment is that each laser light source 10 comprises a phase control device 14 controlling the phase of the laser beam 11 emitted from the laser light source 10. In this embodiment, the phase control device 14 is inserted into the optical fiber 13 of each laser light source 10.

In the laser beam irradiation apparatus 100A according to the second embodiment, the phases of the laser beams 11 incident on the light-condensing optics system 20 are controlled by the phase control devices 14 and this achieves control of the shapes of the wave fronts of the laser beams 21 emitted from the light-condensing optics system 20 to shapes suitable for propagation. This effectively improves the light-condensing ability. The phases of the laser beams 21 may be made the same on the emitting face 20b of the light-condensing optics system 20, for example, by controlling the phases of the laser beams 11 emitted from the laser light sources 10 with the phase control devices 14. This achieves aperture synthesis, improving the light-condensing ability.

Third Embodiment

FIG. 4 is a diagram schematically illustrating the configuration of a laser beam irradiation apparatus 100B, according to a third embodiment. The laser beam irradiation apparatus 100B according to the third embodiment is configured similarly to the laser beam irradiation apparatus 100 according to the first embodiment; a difference from the laser beam irradiation apparatus 100 according to the first embodiment is that the laser beam irradiation apparatus 100B according to the third embodiment comprises beam shaping optics systems 15 which respectively shape the wave fronts of the laser beams 11 emitted from the laser light sources 10. In this embodiment, the beam shaping optics systems 15 are coupled to light-emitting ends of the optical fibers 13 of the respective laser light sources 10, the laser beams 11 being emitted from the light-emitting ends. Optical elements such as concave lenses and convex lenses may be used as the beam shaping optics systems 15.

In the third embodiment, the wave fronts of the laser beams 11 emitted from the respective laser light sources 10 are shaped by the beam shaping optics systems 15 and this successfully controls the shapes of the wave fronts of the laser beams 21 emitted from the light-condensing optics system 20 to shapes suitable for propagation. This effectively improves the light-condensing ability.

Although FIG. 4 illustrates the configuration in which each laser light source 10 comprises a beam shaping optics system 15, a common beam shaping optics system 16 may instead be provided for a plurality of laser light sources 10 as illustrated in FIG. 5. The beam shaping optics system 16 shapes the wave fronts of the laser beams 11 emitted from the respective laser light sources 10 and thereby controls the shapes of the wave fronts of the laser beams 21 emitted from the light-condensing optics system 20 to shapes suitable for propagation.

Figure 6:
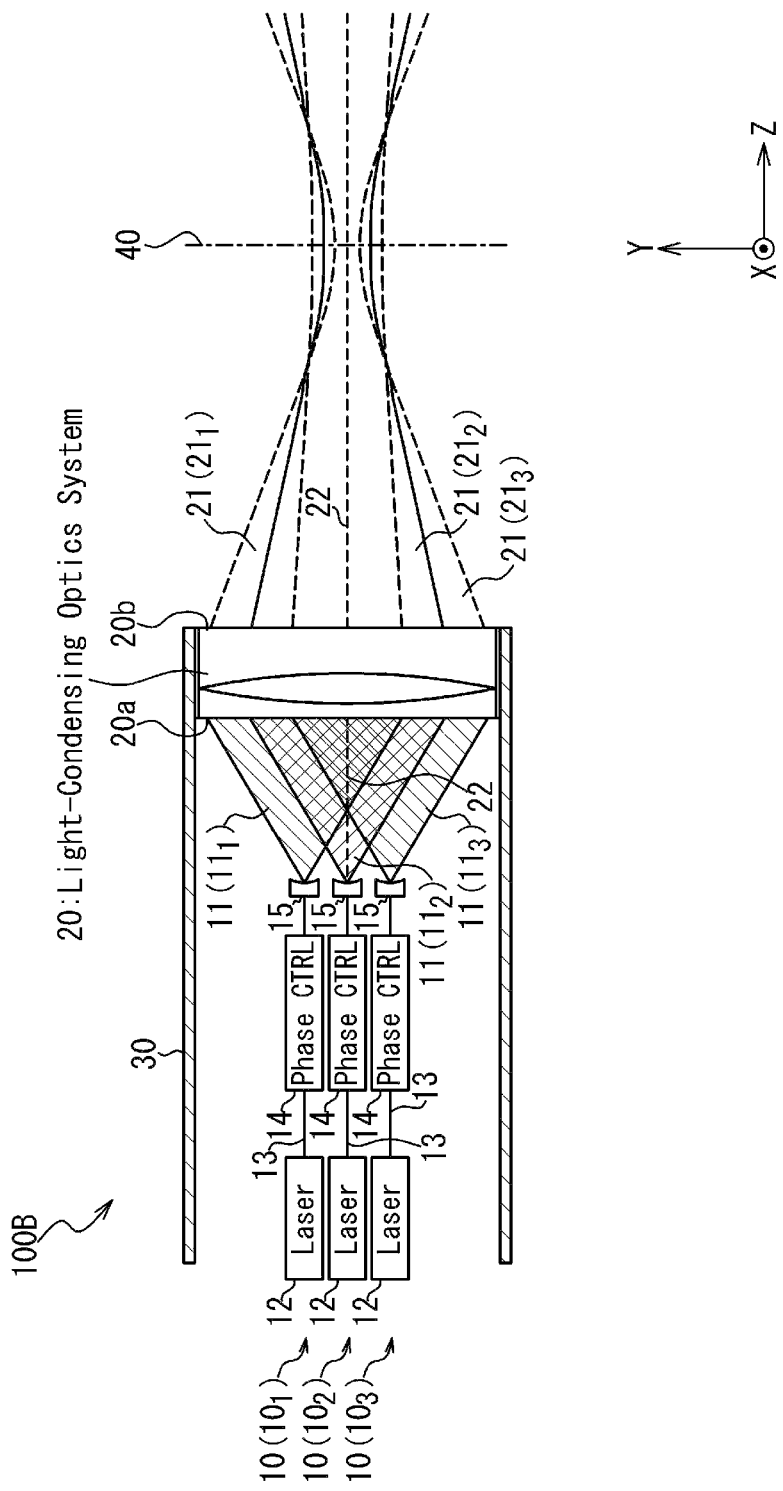
FIG. 6 is a diagram schematically illustrating the configuration of another example variation of the laser beam irradiation apparatus, according to the third embodiment.

As illustrated in FIG. 6, the laser beam irradiation apparatus 100B according to the second embodiment, which comprises the phase control devices 14, may further comprise the beam shaping optics systems 15 (or the beam shaping optics system 16). In this case, since the phases of the laser beams 11 incident on the respective beam shaping optics systems 15 are controlled, it is possible to control the shapes of the wave fronts of the laser beams 21 emitted from the light-condensing optics system 20 to shapes suitable for propagation, while the configurations of the beam shaping optics systems 15 are simplified.

Fourth Embodiment

Figure 7:
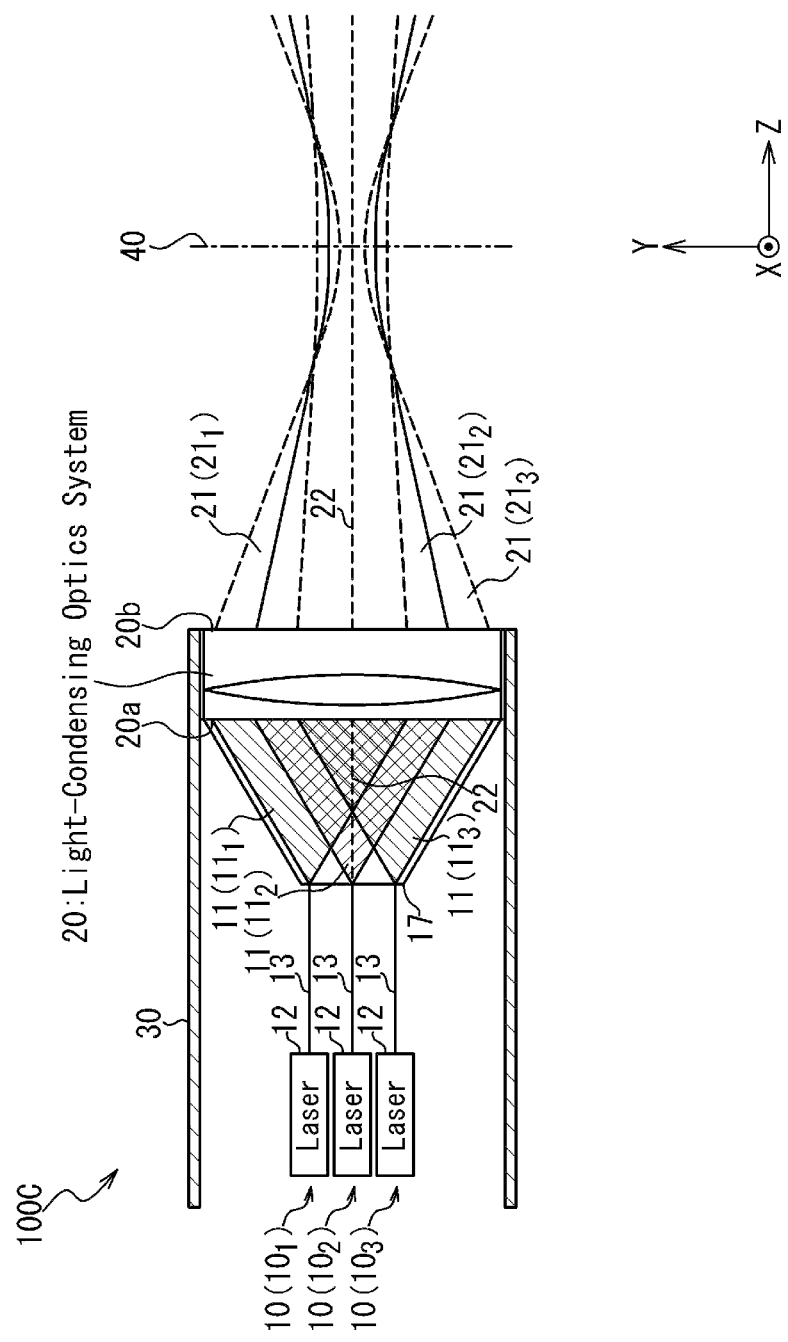
FIG. 7 is a diagram schematically illustrating the configuration of a laser beam irradiation apparatus, according to a fourth embodiment.

FIG. 7 is a diagram schematically illustrating the configuration of a laser beam irradiation apparatus 100C, according to a fourth embodiment. The laser beam irradiation apparatus 100C according to the fourth embodiment is configured similarly to the laser beam irradiation apparatus 100 according to the first embodiment; a difference from the laser beam irradiation apparatus 100 according to the first embodiment is that the laser light sources 10 are coupled to the incident face 20a of the light-condensing optics system 20 with a coupling optical element 17. In this embodiment, the coupling optical element 17 is coupled to the light-emitting ends of the optical fibers 13 of the respective laser light sources 10, the laser beams 11 being emitted from the light-emitting ends. Examples of the coupling optical element 17 include a tapered lens. The coupling optical element 17 may be coupled to the optical fibers 13 by fusion bonding. The coupling optical element 17 is configured to guide the laser beams 11 emitted from the optical fibers 13 of the respective laser light sources 10 to the incident face 20a of the light-condensing optics system 20.

In this embodiment, the coupling optical element 17, which is coupled to the light-emitting ends of the optical fibers 13, effectively facilitates the alignment of the optical fibers 13. Note that the coupling optical element 17 may have the function of shaping the wave fronts of the laser beams 11 emitted from the respective laser light sources 10. This is useful for controlling the shapes of the wave fronts of the laser beams 21 emitted from the light-condensing optics system 20 to shapes suitable for propagation.

Figure 8:
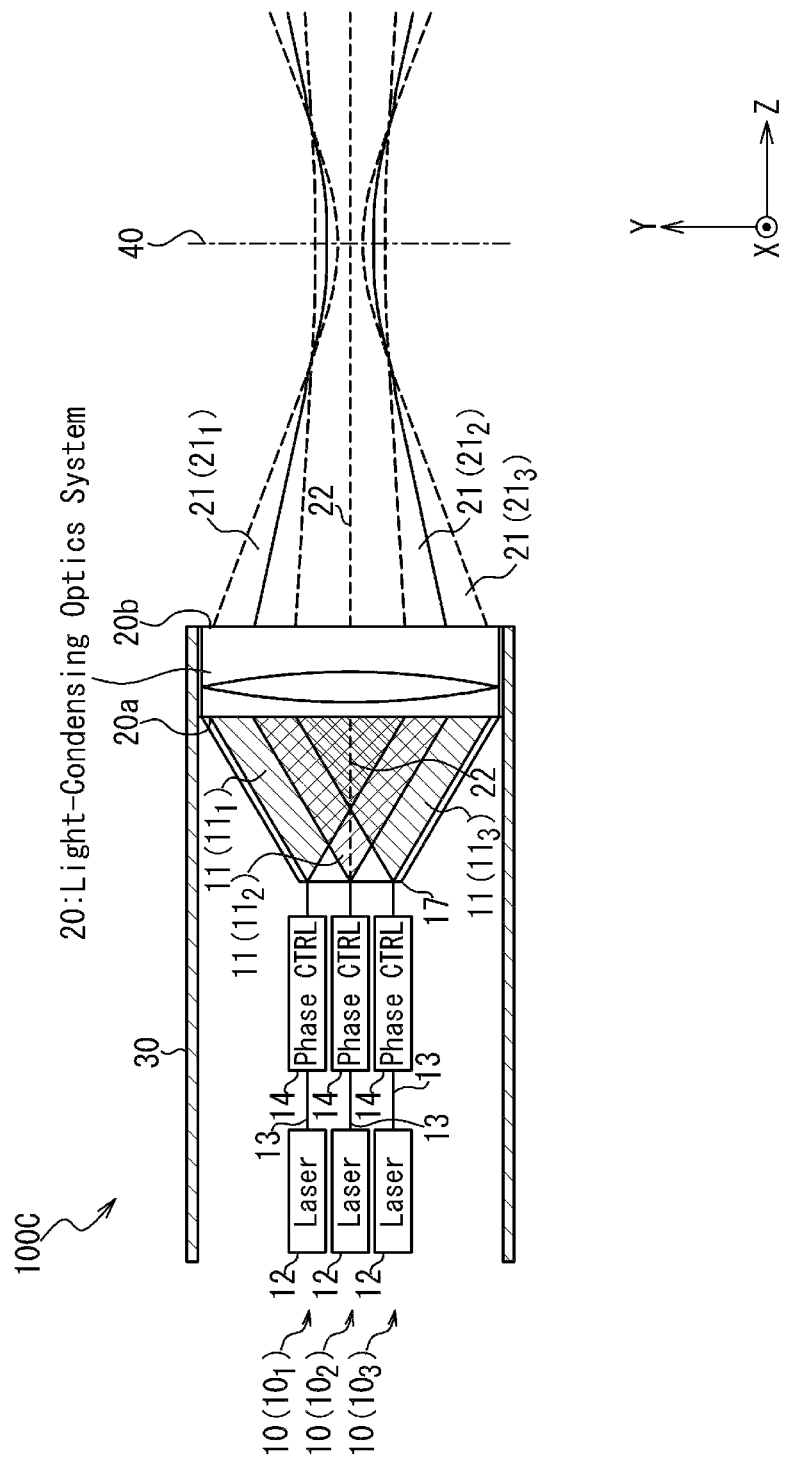
FIG. 8 is a diagram schematically illustrating the configuration of an example variation of the laser beam irradiation apparatus, according to the fourth embodiment.

Also in this embodiment, as illustrated in FIG. 8, the laser light sources 10 may respectively comprise phase control devices 14 which control the phases of the laser beams 11, which are respectively emitted from the laser light sources 10. This effectively controls the shapes of the wave fronts of the laser beams 21 emitted from the light-condensing optics system 20 to shapes suitable for propagation.

Fifth Embodiment

Figure 9:
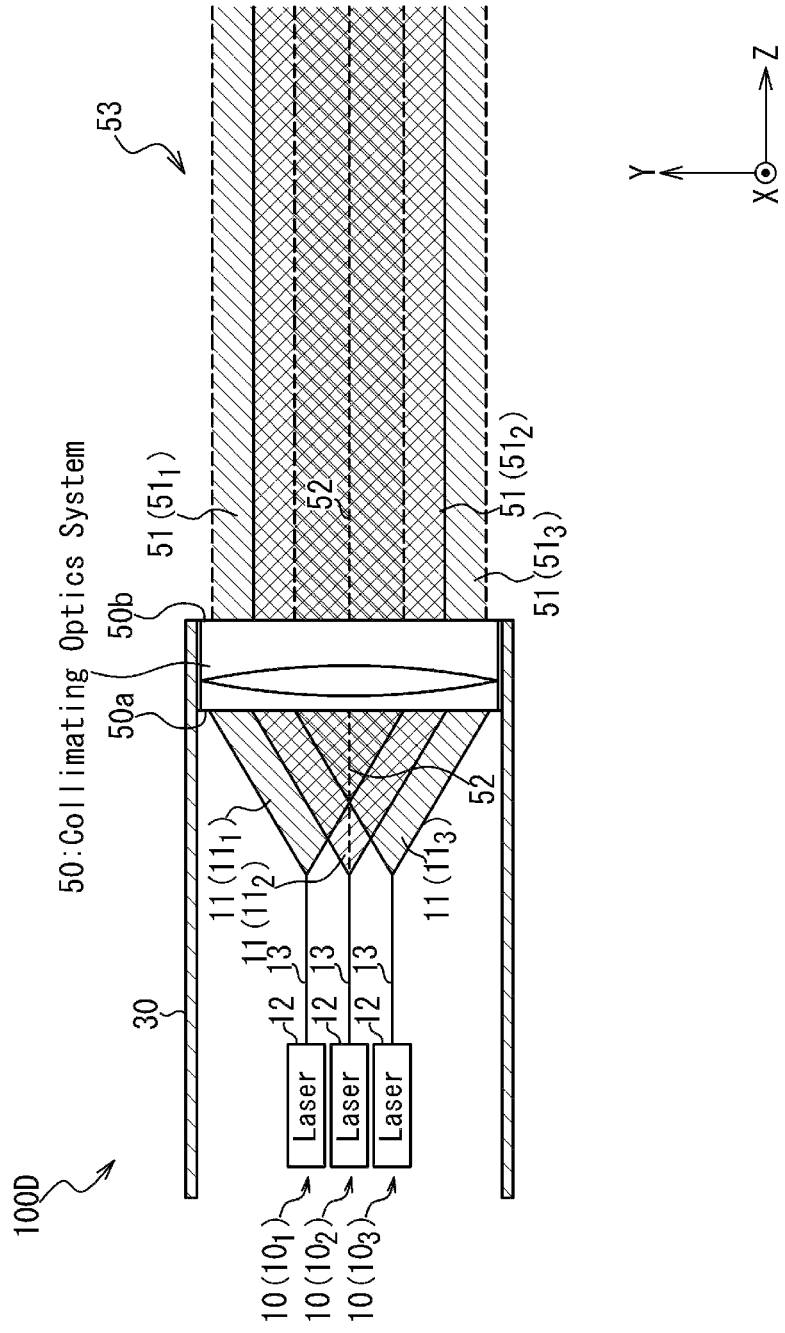
FIG. 9 is a diagram schematically illustrating the configuration of a laser beam irradiation apparatus, according to a fifth embodiment.

FIG. 9 is a diagram schematically illustrating the configuration of a laser beam irradiation apparatus 100D, according to a fifth embodiment. In the fifth embodiment, a collimating optics system 50 generating a collimated laser beam 51 from each laser beam 11 is used in place of the light-condensing optics system 20 differently from the above-described embodiments, in which the light-condensing optics system 20 is used. The laser light sources 10 and the collimating optics system 50 are housed in the lens barrel 30. In the following, a detailed description is given of the configuration of the laser beam irradiation apparatus 100D according to this embodiment.

The laser light sources 10 respectively emit laser beams 11. The laser beams 11 emitted from the laser light sources 10 are made incident on an incident face 50a of the collimating optics system 50. As is the case with the first to fourth embodiments, each laser light source 10 is configured to emit a laser beam 11 so that the beam diameter of the laser beam 11 is expanded towards the incident face 50a of the collimating optics system 50. Additionally, the laser light sources 10 are arranged so that the laser beam 11 emitted from each laser light source 10 overlaps at least one of the laser beams 11 emitted from the other laser light sources 10 on the incident face 50a. This configuration is useful for generating a high-power synthesized laser beam, while suppressing an increase in the physical size of the laser beam irradiation apparatus 100D. Under this aim, when the number of the laser light sources 10 is three or more, it is preferable that the laser light sources 10 are arranged so that the laser beam 11 emitted from each laser light source 10 overlaps all the laser beams 11 emitted from the other laser light sources 10 on the incident face 50a.

The collimating optics system 50 generates laser beams 51 by performing a predetermined optical operation on the laser beams 11 incident on the incident face 50a, and emits the generated laser beams 51 from an emitting face 50b. Here, the collimating optics system 50 is configured so that the laser beams 51 emitted from the emitting face 50b are collimated beams. The collimating optics system 50 is configured so that, when a laser beam 11 of a beam shape circular symmetric about the optical axis 52 thereof is made incident on the incident face 50*a*, the beam shape of the laser beam 51 generated from the laser beam 11 and emitted from the emitting face 50*b* is circular symmetric about the optical axis 52.

In the following, the laser beams 51 generated from the laser beams 11$_1$ to 11$_3$ and emitted from the emitting face 50*b* may be referred to as laser beams 51$_1$ to 51$_3$, respectively. In this embodiment, the collimating optics system 50 is arranged so that the optical axis 52 thereof is parallel to the Z axis direction. The laser beams 51 emitted from the emitting face 50*b* of the collimating optics system 50 are irradiated on a desired target, overlapping each other. In other words, the laser beams 51 emitted from the emitting face 50*b* of the collimating optics system 50 are synthesized to generate a synthesized beam 53 to be irradiated on the target.

Figure 10:
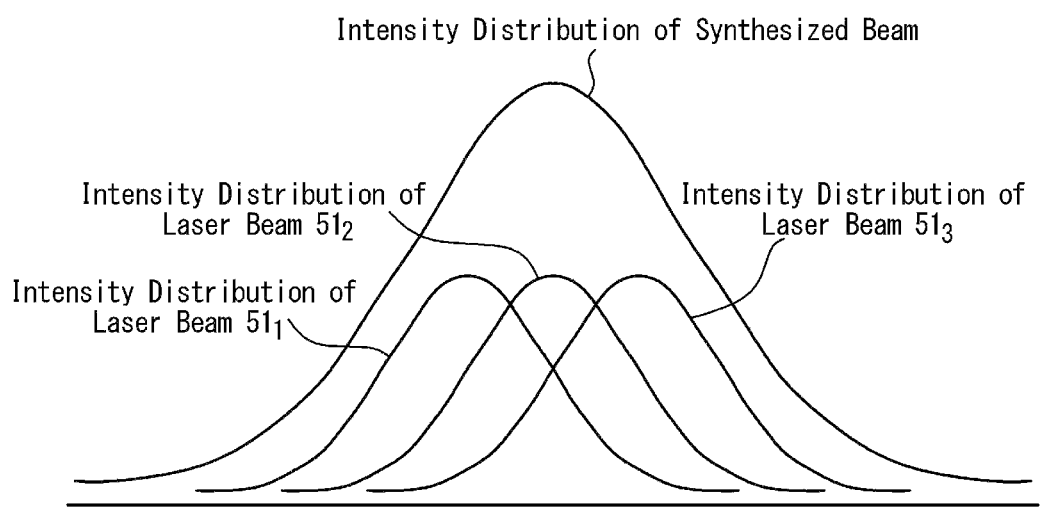
FIG. 10 is a diagram illustrating one example intensity distribution of respective laser beams on an emitting face of a collimating optics system, according to the fifth embodiment.

FIG. 10 is a diagram illustrating one example intensity distribution of the respective laser beams on the emitting face 50*b* of the collimating optics system 50. The intensity distribution of the synthesized laser beam obtained by synthesizing the laser beams 51 is the superposition of the intensity distributions of the respective laser beams 51. When the laser beams 11 incident on the incident face 50*a* are Gaussian beams and accordingly the laser beams 51 emitted from the emitting face 50*b* are also Gaussian beams, the intensity distribution of the synthesized laser beam is in a relatively broad Gaussian distribution. In the fifth embodiment, the laser beams 51 are propagated along the optical axis 52 so that the intensity distributions of the respective laser beams 51 are kept unchanged from those on the emitting face 50*b*.

Additionally, in the fifth embodiment, the laser light source 10 and the collimating optics system 50 are arranged so that the distance between the optical axis 52 and the center of each laser beam 51 emitted from the emitting face 50*b* is smaller than the beam radius of each laser beam 51, which is half of the beam diameter (or the spot diameter) of each laser beam 51. Also in this embodiment, the beam diameter is defined as the D86 width (the diameter of the circle encompassing 86% of the beam power, the center of the circle being positioned at the geometric center of the beam profile), and the position of the center of each laser beam 51 is defined as the position of the geometric center of the beam profile of each laser beam 51 on a plane orthogonal to the optical axis 52. This effectively maintains the combination of the laser beams 51 on the target. Also in this embodiment, in which the laser beams 11 are made incident on the incident face 50*a* at different positions, the positions of the beam centers of the laser beams 51 emitted from the emitting face 50*b* may be different from each other; however, when the distance between the optical axis 52 and the center of each laser beam 51 is smaller than the beam radius of each laser beam 51, each laser beam 51 overlaps other laser beams 51. This achieves beam combination.

Although FIG. 9 illustrates the configuration in which the light-condensing optics system 20 of the laser beam irradiation apparatus 100 according to the first embodiment is replaced with the collimating optics system 50, the light-condensing optics systems 20 of the laser beam irradiation apparatuses 100A to 100C according to the second to fourth embodiments may be replaced with the collimating optics system 50.

Figure 11A:
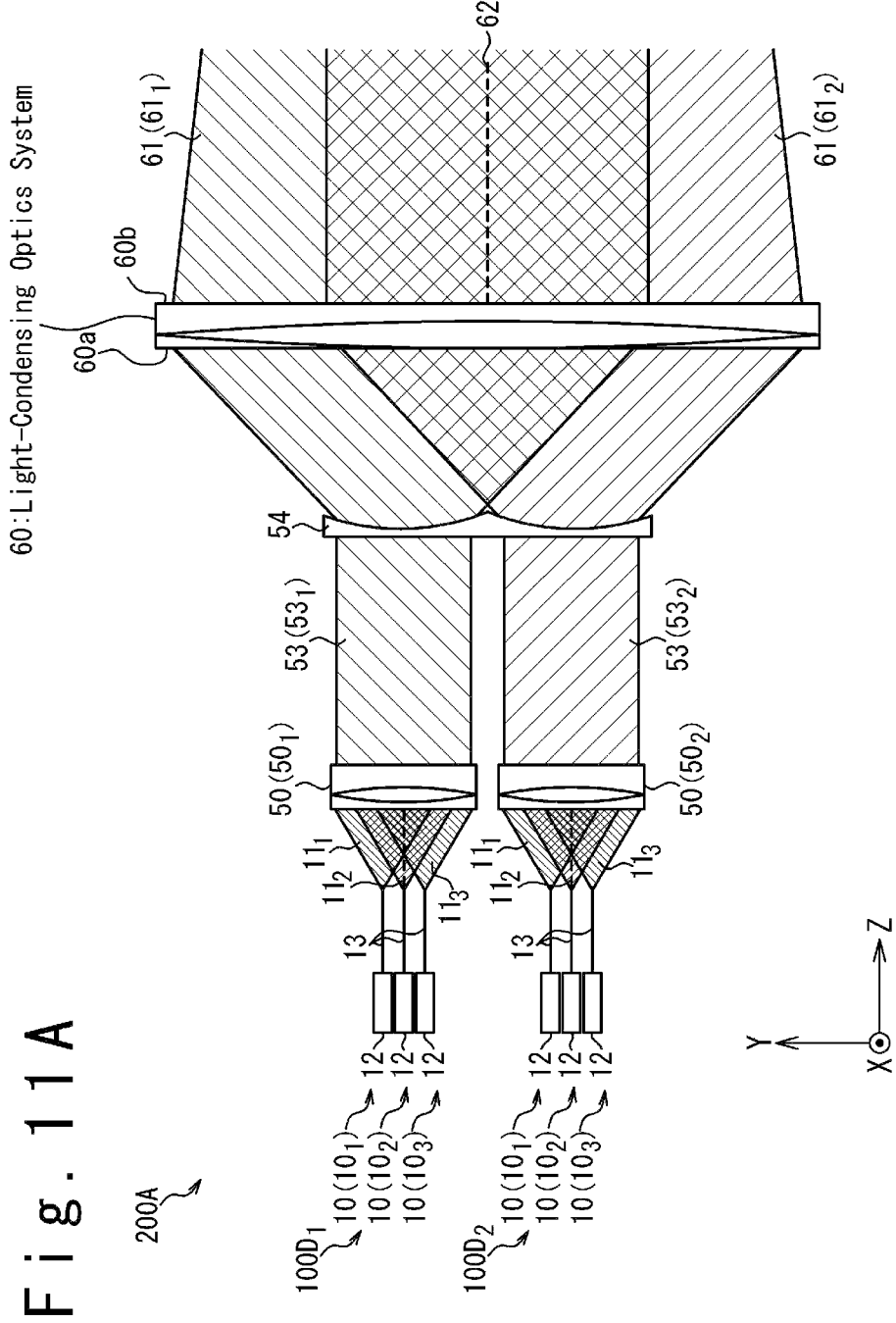
FIG. 11A is a diagram schematically illustrating the configuration of a laser beam irradiation system which comprises a plurality of laser beam irradiation apparatuses according to the fifth embodiment and is configured to combine synthesized laser beams generated by the respective laser beam irradiation apparatuses by using a light-condensing optics system.

Multiple laser beam irradiation apparatuses 100D according to this embodiment may be provided and synthesized laser beams respectively generated by the laser beam irradiation apparatuses 100D may be further combined by using a light-condensing optics system. FIG. 11A is a diagram schematically illustrating one example configuration of a laser beam irradiation system 200A thus configured.

The laser beam irradiation system 200A illustrated in FIG. 11A comprises two laser beam irradiation apparatuses 100D. In the following, to distinguish the two laser beam irradiation apparatuses 100D from each other, one of the laser beam irradiation apparatuses 100D may be referred to as laser beam irradiation apparatus 100D$_1$ and the other may be may be referred to as laser beam irradiation apparatus 100D$_2$.

Each of the two laser beam irradiation apparatuses 100D emits a synthesized beam 53 from the collimating optics system 50. In the following, the collimating optics system 50 of the laser beam irradiation apparatus 100D$_1$ may be referred to as collimating optics system 50$_1$ and the synthesized beam 53 emitted from the collimating optics system 50$_1$ may be referred to as synthesized beam 53$_1$. Correspondingly, the collimating optics system 50 of the laser beam irradiation apparatus 100D$_2$ may be referred to as collimating optics system 50$_2$ and the synthesized beam 53 emitted from the collimating optics system 50$_2$ may be referred to as synthesized beam 53$_2$.

The synthesized beams 53$_1$ and 53$_2$ emitted from the laser beam irradiation apparatuses 100D$_1$ and 100D$_2$ are combined by a beam shaping optical element 54 and a light-condensing optics system 60. In detail, the beam shaping optical element 54 shapes the wave fronts of the synthesized beams 53$_1$ and 53$_2$ emitted from the laser beam irradiation apparatuses 100D$_1$ and 100D$_2$, respectively. The synthesized beams 53$_1$ and 53$_2$ emitted from the beam shaping optical element 54 are made incident on an incident face 60*a* of the light-condensing optics system 60. The beam shaping optical element 54 is configured so that the beam diameters of the synthesized beams 53$_1$ and 53$_2$ emitted from the beam shaping optical element 54 are expanded towards the incident face 60*a*.

The light-condensing optics system 60 generates laser beams 61$_1$ and 61$_2$ by performing an optical operation on the synthesized beams 53$_1$ and 53$_2$ incident on the incident face 60*a* and emits the generated laser beams 61$_1$ and 61$_2$ from an emitting face 60*b*. The optical operation performed by the light-condensing optics system 20 comprises an operation for condensing the respective laser beams 61$_1$ and 61$_2$. In this embodiment, the light-condensing optics system 60 is arranged so that the optical axis 62 thereof is parallel to the Z axis direction. The laser beams 61$_1$ and 61$_2$ emitted from the emitting face 60*b* of the light-condensing optics system 60 are irradiated on a desired target, overlapping with each other.

Similarly to the light-condensing optics system 20 used in the first embodiment, the light-condensing optics system 60 is configured so that the laser beams 61$_1$ and 61$_2$ have beam waists on a common target face (that is, the spot diameters are minimal on the common target face), where the target face is a plane defined to be orthogonal to the optical axis 62 of the light-condensing optics system 60; the target face is parallel to the XY plane, in this embodiment. To irradiate the laser beams 61$_1$ and 61$_2$ on a target, the target face is defined to cross the target.

The light-condensing optics system 60 is further configured so that the beam diameters (or the spot diameters) of both the laser beams 61$_1$ and 61$_2$ are minimal on the target face, which is a plane defined orthogonally to the optical axis 62 of the light-condensing optics system 60, and the distance between the optical axis 62 and the center of each of the laser beams 61$_1$ and 61$_2$ on the target face is smaller than the beam radius of each of the laser beams $61_1$ and $61_2$ on the target face 40, where the beam radius of each of the laser beams $61_1$ and $61_2$ is half the beam diameter on the target face. As described in the first embodiment, such configuration maintains the combination of the laser beams $61_1$ and $61_2$ on the target face.

The laser beam irradiation system 200A configured as illustrated in FIG. 11A can combine an increased number of laser beams while maintaining the light-condensing ability, facilitating generation of a high-power synthesized laser beam.

Multiple laser beam irradiation apparatuses 100D according to this embodiment may be provided and synthesized laser beams respectively generated by the laser beam irradiation apparatuses 100D may be further combined by using a collimating optics system. FIG. 11B is a diagram schematically illustrating one example configuration of a laser beam irradiation system. 200B thus configured.

The laser beam irradiation system 200B illustrated in FIG. 11B is configured similarly to the laser beam irradiation system 200A illustrated in FIG. 11A; a difference is that a collimating optics system 70 is provided in place of the light-condensing optics system 60. The synthesized beams $53_1$ and $53_2$ emitted from the beam shaping optical element 54 are made incident on an incident face 70a of the collimating optics system 70. The beam shaping optical element 54 is configured so that the beam diameters of the synthesized beams $53_1$ and $53_2$ emitted from the beam shaping optical element 54 are expanded towards the incident face 70a.

The collimating optics system 70 generates collimated laser beams $71_1$ and $71_2$ from the synthesized beams $53_1$ and $53_2$ incident on the incident face 70a, and emits the generated laser beams $71_1$ and $71_2$ from an emitting face 70b. In this embodiment, the collimating optics system 70 is arranged so that the optical axis 72 thereof is parallel to the Z axis direction. The laser beams $71_1$ and $71_2$ emitted from the emitting face 70b of the collimating optics system 70 are irradiated on a desired target, overlapping with each other. In other words, a synthesized beam to be irradiated on the target is generated by synthesizing the laser beams $71_1$ and $71_2$ emitted from the emitting face 70b of the collimating optics system 70. The laser beam irradiation apparatuses 100D, the beam shaping optical element 54, and the collimating optics system 70 are arranged so that the distance between the optical axis 72 and the center of each of the laser beams $71_1$ and $71_2$ emitted from the emitting face 70b is smaller than the beam radius of each of the laser beams $71_1$ and $71_2$, where the beam radius of each of the laser beams $71_1$ and $71_2$ is half the beam diameter (or the spot diameter) of the same.

The laser beam irradiation system 200B configured as illustrated in FIG. 11B can combine an increased number of laser beams, facilitating generation of a high-power synthesized laser beam.

Sixth Embodiment

FIG. 12 is a diagram schematically illustrating the configuration of a laser beam irradiation apparatus 100E, according to a sixth embodiment. The laser beam irradiation apparatus 100E according to the sixth embodiment is configured similarly to the laser beam irradiation apparatus 100D according to the fifth embodiment (see FIG. 9); a difference is that the laser beam irradiation apparatus 100E according to the sixth embodiment additionally comprises a solid state laser amplifier 80. The solid state laser amplifier 80 generates an amplified laser beam 81 by performing laser amplification on the laser beams 51 emitted from the emitting face 50b of the collimating optics system 50. The configuration of the laser beam irradiation apparatus 100E according to the sixth embodiment is advantageous for generating a high-power laser beam while reducing the number of laser light sources 10 included in the laser beam irradiation apparatus 100E.

The laser beam irradiation apparatus 100E according to this embodiment is especially useful when fiber lasers are used as the laser devices 12 of the laser light sources 10, especially when fiber lasers generating pulsed light or laser light of a narrow linewidth are used. The allowed maximum pulse energy of a fiber laser is small although a fiber laser has a higher efficiency than a solid-state laser in a low power region. In contrast, the allowed maximum pulse energy of a solid-state laser is large. A fiber laser suffers from a reduced upper limit of the output power for a reduced line width due to significant non-linear effects, while a solid-state laser, which exhibits reduced non-linear effects, can offer both of a narrow linewidth and a high power at the same time. A configuration in which laser light generated by a fiber laser is amplified by a solid-state laser is advantageous for making use of such properties of the fiber laser and the solid state laser. The laser beam irradiation apparatus 100E according to this embodiment, which uses fiber lasers as the laser devices 12 of the laser light sources 10, effectively provides a configuration in which a plurality of laser beams generated by the fiber lasers are combined and amplified by the solid state laser amplifier 80.

Although embodiments of the present invention have been specifically described in the above, the present invention is not limited to the above-described embodiments. A person skilled in the art would understand that the present invention may be implemented with various modifications. It should also be noted that the above-described embodiments may be combined in an actual implementation as long as there is no technical inconsistency.

The present application, which is based on Japanese patent application No. 2017-145402, filed on Jul. 27, 2017, claims priority based on the convention. The disclosure of the same is incorporated herein by reference in its entirety.

The invention claimed is:

1. A laser beam irradiation apparatus, comprising:
   a plurality of laser devices emitting a plurality of first laser beams, respectively;
   a plurality of optical fibers each comprising an input end and an output end and outputting from the output end a corresponding one of the plurality of first laser beams received on the input end so that a beam diameter of the corresponding one of the plurality of first laser beams increases with a distance from the output end; and
   an optics system comprising an incident face and an emitting face, receiving the plurality of first laser beams emitting from the plurality of optical fibers on the incident face as a plurality of input laser beams, and performing an optical operation to emit a plurality of second laser beams associated with the plurality of input laser beams, respectively,
   wherein each of the plurality of the input laser beams overlaps all other first laser beams on the incident face of the optics system,
   wherein the optics system comprises a light-condensing optics system configured so that the beam diameter of each of the plurality of second laser beams emitted from the light-condensing optics system is minimal on the target face, and wherein the optics system is configured so that a distance between a center of each of the plurality of second laser beams and an optical axis of the optics system on a target face defined to be orthogonal to the optical axis is smaller than a beam radius of each of the second laser beams on the target face.

2. The laser beam irradiation apparatus according to claim 1, further comprising:
a plurality of phase control devices controlling phases of the first laser beams so that phases of the plurality of second laser beams are made the same on the emitting face of the optics system.

3. The laser beam irradiation apparatus according to claim 1, further comprising:
a plurality of beam shaping optics systems provided between the output ends of the plurality of optical fibers and the optics system to shape wave fronts of the plurality of the first laser beams.

4. The laser beam irradiation apparatus according to claim 1, further comprising:
a coupling optical element coupled to the output ends of the plurality of optical fibers and configured to guide the plurality of first laser beams emitted from the optical fibers to the incident face of the optics system.

5. A laser beam irradiation system, comprising:
a plurality of laser beam irradiation apparatuses; and
a light-condensing optics system,
wherein each of the plurality of laser beam irradiation apparatuses comprises:
a plurality of laser devices emitting a plurality of first laser beams, respectively;
a plurality of optical fibers each comprising an input end and an output end and outputting from the output end a corresponding one of the plurality of first laser beams received on the input end so that a beam diameter of the corresponding one of the plurality of first laser beams increases with a distance from the output end; and
a collimating optics system comprising an incident face and an emitting face, receiving the plurality of first laser beams emitted from the plurality of optical fibers on the incident face as a plurality of input laser beams, and performing an optical operation to emit a plurality of second laser beams which are collimated beams, the second laser beams being associated with the first laser beams, respectively,
wherein each of the plurality of the input laser beams overlaps at least one of the other first laser beams on the incident face of the collimating optics system, and
wherein the collimating optics system is configured so that a distance between a center of each of the plurality of second laser beams and an optical axis of the collimating optics system is smaller than a beam radius of each of the second laser beams,
wherein synthesized beams each composed of the plurality of the second laser beams emitted from each of the plurality of laser beam irradiation apparatuses are made incident on an incident face of the light-condensing optics system,
wherein the light-condensing optics system is configured to perform an optical operation on the synthesized beams to emit third laser beams respectively associated with the synthesized beams, and
wherein the light-condensing optics system is configured so that beam diameters of all the third laser beams emitted from the light-condensing optics system are minimal on a target face which is a plane defined to be orthogonal to an optical axis of the light-condensing optics system, and a distance between a center of each of the third laser beams and the optical axis on the target face is smaller than a beam radius of each of the third laser beams on the target face.

6. A laser beam irradiation system, comprising:
a plurality of laser beam irradiation apparatuses; and
a first collimating optics system,
wherein each of the plurality of laser beam irradiation apparatuses comprises:
a plurality of laser devices emitting a plurality of first laser beams, respectively;
a plurality of optical fibers each comprising an input end and an output end and outputting from the output end a corresponding one of the plurality of first laser beams received on the input end so that a beam diameter of the corresponding one of the plurality of first laser beams increases with a distance from the output end; and
a second collimating optics system comprising an incident face and an emitting face, receiving the plurality of first laser beams emitted from the plurality of optical fibers on the incident face as a plurality of input laser beams, and performing an optical operation to emit a plurality of second laser beams which are collimated beams, the second laser beams being associated with the first laser beams, respectively,
wherein each of the plurality of the input laser beams overlaps at least one of the other first laser beams on the incident face of the second collimating optics system,
wherein the second collimating optics system is configured so that a distance between a center of each of the plurality of second laser beams and an optical axis of the second collimating optics system is smaller than a beam radius of each of the second laser beams,
wherein synthesized beams each composed of the plurality of the second laser beams emitted from each of the plurality of laser beam irradiation apparatuses are made incident on an incident face of the first collimating optics system, and
wherein the first collimating optics system is configured to perform an optical operation on the synthesized beams to emit third laser beams which are collimated beams, the third laser beams being associated with the synthesized beams, respectively.

* * * * *